Oct. 6, 1936.                J. WHALEN                     2,056,414
                        FLUID FUEL CONTROL MEANS
                        Filed June 21, 1934           3 Sheets—Sheet 1

INVENTOR
JAMES WHALEN.
BY
J.C. Baresh
ATTORNEY

Oct. 6, 1936.   J. WHALEN   2,056,414
FLUID FUEL CONTROL MEANS
Filed June 21, 1934   3 Sheets-Sheet 2
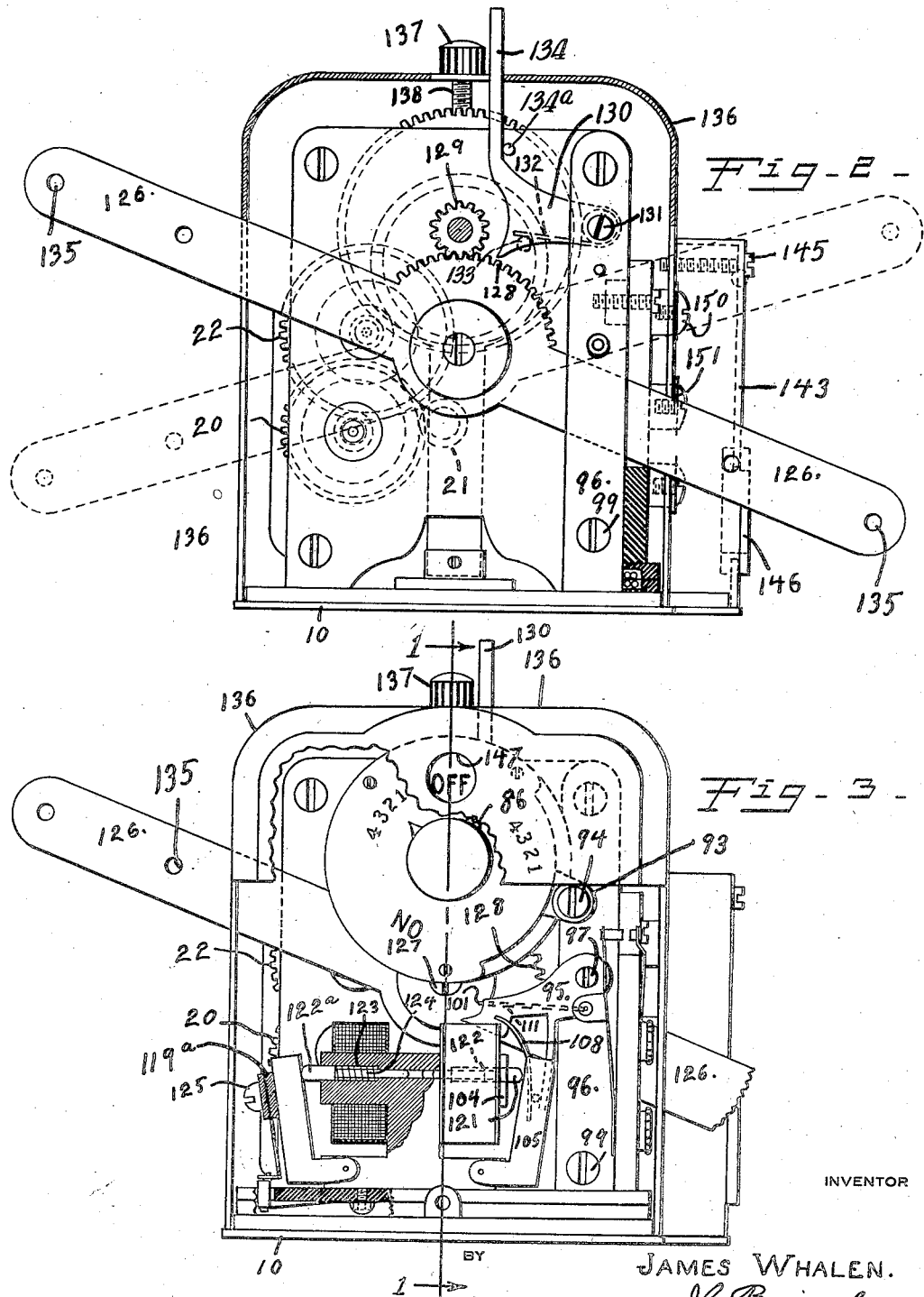
INVENTOR
JAMES WHALEN.
BY
J C Baisch
ATTORNEY Oct. 6, 1936.                J. WHALEN                2,056,414
                       FLUID FUEL CONTROL MEANS
                       Filed June 21, 1934          3 Sheets-Sheet 3
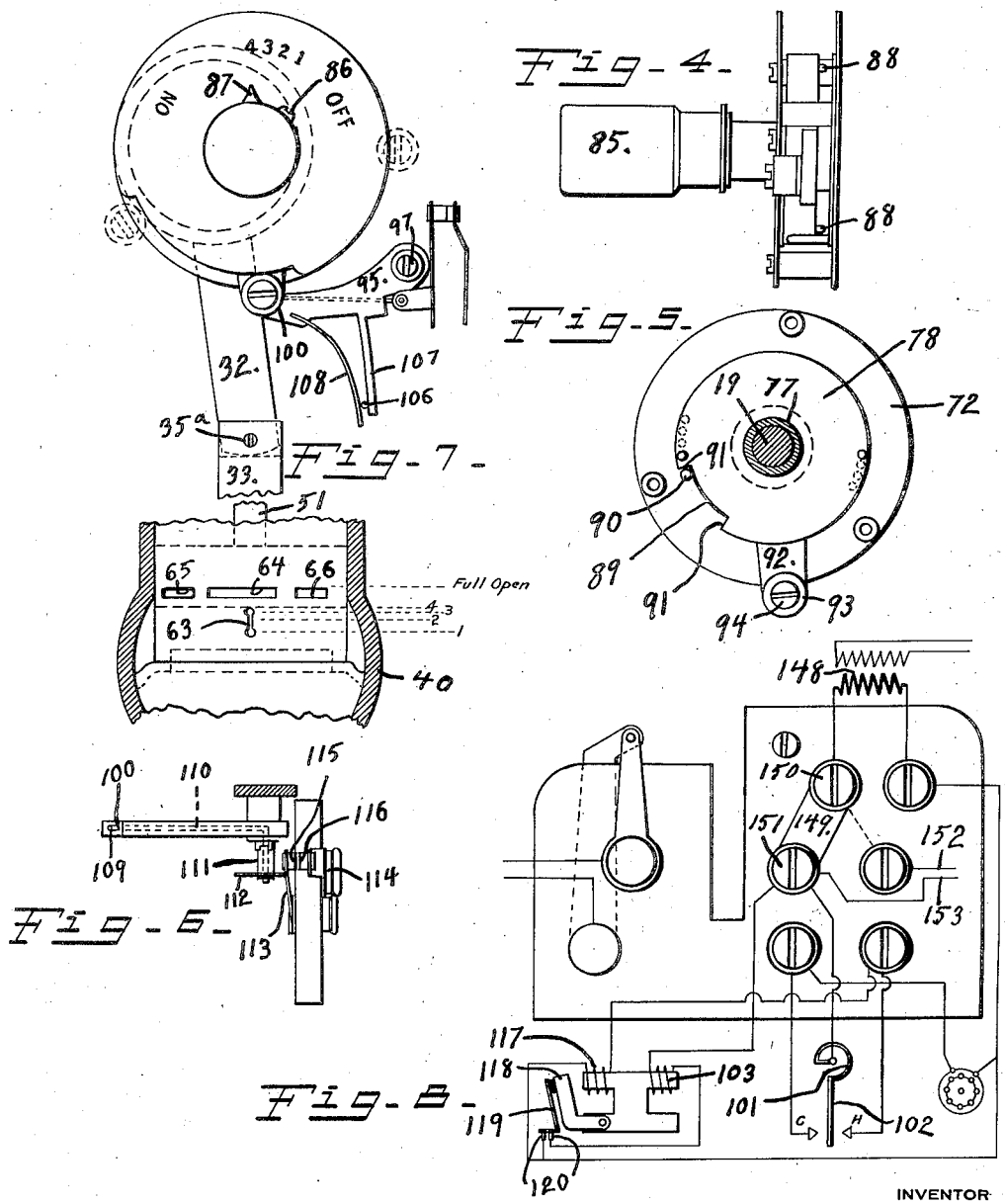
INVENTOR
JAMES WHALEN.
BY
            J.C. Baisch
                        ATTORNEY Patented Oct. 6, 1936

2,056,414

UNITED STATES PATENT OFFICE 2,056,414

FLUID FUEL CONTROL MEANS

James Whalen, Omaha, Nebr.

Application June 21, 1934, Serial No. 731,625

4 Claims. (Cl. 236—74)

This invention has to do with means for controlling fluid fuel and particularly to modulating valves employed for regulating the supply of fluid fuel to furnaces or the like.

In its preferred embodiment the invention is for use in connection with furnaces using fluid fuel such as gas or oil and said device is used in combination with an electric thermostat for controlling the operation thereof. It comprises a valve, automatic valve operating means, adjustable modulating means, means for manually operating the valve upon the failure of the electric current supply, damper and draft operating means, and fan controlling means for a fan for forcing air through the heat conduits of the furnace.

While the invention includes the combined instrumentalities above mentioned, I wish it to be understood that I consider the aforesaid valve and means not only combinatively novel, but in so far as I am advised, certain of the devices going to make up such valve and means are new in less combinations than the whole, and some capable of individual use, as will more clearly appear hereinafter.

To fully explain the advantages of my invention I shall refer briefly to the operation of well-known types of fluid fuel valves for furnaces which have electric thermostatic means for controlling the operation thereof. In these valves there are substantially but two positions, the closed position and the open position. The thermostat is situated in one of the rooms of the house and set for the desired house temperature. When the house temperature falls low enough, usually several degrees below the temperature for which the thermostat is set, the thermostat closes an electric circuit to the valve operating mechanism which operates to open the valve. The fuel thereupon passes on to the burner which burns with a full flame. The furnace then heats the house until the temperature rises to a predetermined point, as fixed by the thermostatic setting, which point usually being several degrees above the temperature for which the thermostat is set. At this point the thermostat, which has already opened the above mentioned circuit, closes another circuit which causes the operating mechanism to close the valve and shut off the fuel to the burner. The furnace now ceases to heat the house until the temperature in the house drops to a point that will cause the thermostat to start the burner again. During this period between the shutting off of the furnace and the starting up again thereof no heat is developed for delivery to the rooms of the house and as a consequence a layer of cold air forms on the floors of said house.

With the foregoing in view it is my object to provide fluid fuel control means especially adapted for use with furnaces, and operable to start and shut off the supply of fuel or to allow a limited amount of fuel to pass therethrough to the furnace burner to operate said burner at a reduced or modulated heating speed to supply heat to the house at all required times.

Another object is to provide means for adjusting the amount of fuel passing to the burner when said burner is operating at the reduced or modulated heating speed.

A further object is to provide an electric-motor-driven valve actuating means having special thermostatically controlled relays for controlling the electric circuits of the valve actuating means.

Further objects are to provide means for manually operating the valve in case of failure of the electric current and means for releasably securing the valve in the open position; to provide means for actuating dampers and drafts to supply more or less air respectively as the valve opens or closes in controlling the fuel supply to the burner for more or less heat; and to provide an electric switch and switch actuating means for controlling the electric circuit to an electric fan for forcing air through the furnace heating conduits when the furnace is operating at the reduced or modulated heating position.

Other objects of the invention will appear in the following detailed description taken in connection with the accompanying drawings wherein:

Figure 2 is a rear view of the valve actuating mechanism with the cover cut away and showing the lever for manually operating the valve, said lever also providing means at each end for actuating dampers and drafts.

Figure 3 is a front view of the valve actuating mechanism with the cover partly broken away.

Figure 4 is a side view of the adjustable modulating means in the valve-closed position.

Figure 5 is a front view of the modulating means with the dial removed and with the shaft and sleeve of the said means cut off in a plane with the said dial.

Figure 6 is a plan view of the modulating pawl and fan switch and the means for operating said switch.

Figure 7 is a front view of the modulating means including the valve and valve cup.

Figure 8 is a diagrammatic view of the electric circuits of the invention.

Figure 1:
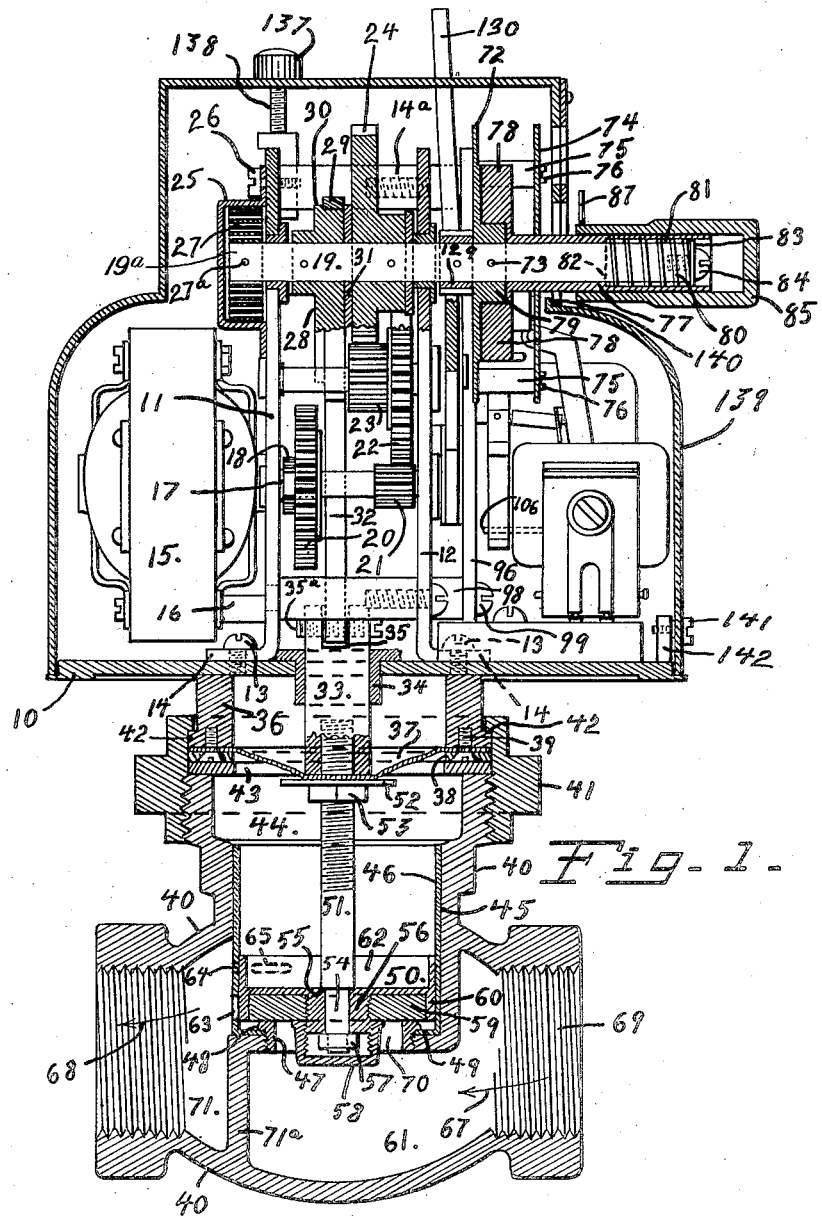
Figure 1 is a longitudinal vertical section on line 1—1 of Figure 3.

Referring more particularly to the drawings reference numeral 10 indicates a base upon which vertical frame members 11 and 12 are secured to said base by screws 13 through angled portions 14. The upper ends of the frame members 11 and 12 are held in spaced relationship with each other by separating posts 14a secured between said frame members by suitable screws 26. An electric motor 15 is supported adjacent to the outer side of the frame member 11 on posts 16. The motor shaft 17 passes through an opening provided therefor in the frame member 11, said shaft having a gear 18 secured on the end thereof. Power is transmitted from the motor through said gear 18 to a shaft 19 mounted in the upper part of the frame members 11 and 12 by means of a chain of gears respectively numbered 20, 21, 22, 23, and 24 from the motor gear 18 and operatively mounted between the frame members 11 and 12. The above gears are adapted to reduce the speed of rotation of shaft 19 relative to the speed of rotation of the motor shaft 17. The rear end 19a of shaft 19 extends through frame member 11 and projects outwardly thereof within a spring housing 25 secured to the outer side of the frame member 11 by means of screw 26. A coil spring 27 is provided within the housing 25 for rotating the shaft 19 in one direction, said spring having one end suitably secured to the housing and the other end secured to the shaft 19 by a pin 27a.

A valve actuating eccentric 28 is secured to shaft 19 between the frame members 11 and 12 behind the gear 24. A collar 29 is received in a groove formed in the eccentric by a flange 30 on one side and a washer 31 on the opposite side thereof. A connecting member 32 connects the collar 29 with a plunger 33 slidably received in a bearing 34 secured in an opening provided therefor through the base 10. The connecting member forms an integral part of the collar 29 but is pivoted in a slot 35 in the upper end of the plunger, a screw 35a being the pivot upon which the connecting member swings.

A cylindrical depending member 36 is secured to the under side of the base 10 by screws through said base or other suitable means, said depending member forming a casing around the lower end of the plunger. A soft flexible diaphragm 37 is secured to the lower edge of the depending member 36 by means of a washer 38 pressed tightly against the under side of the diaphragm and adjacent the outer edge thereof, said washer being secured to the depending member by screws 39 threadably received in openings provided therefor in the depending member.

A valve housing 40 is threadably secured to the depending member 36 by a coupling 41 operatively abutting on an outwardly extending flange 42 on the depending member 36 and adjacent the lower edge thereof. A gas tight union is made by providing a gasket 43 between the washer 38 and the upper edge of the valve housing 40. The upper portion of the valve housing 40 is provided with an enlarged chamber 44 within which the diaphragm may freely operate. Below the chamber 44 and communicating therewith is a vertical cup chamber 45 within which a cup 46 is secured by a removable ring or valve seat 47, said ring being received in an opening in the bottom of the cup provided therefor. Said ring also being threadably received in an opening in the bottom of the cup chamber. An outwardly extending flange 48 of the ring engages the bottom 49 of the cup to draw said cup tightly against the bottom of the cup chamber. Cups having different sized gas openings may be used by removing the ring and cup and inserting a cup with the desired sized openings. The new cup is secured in the cup chamber by tightly replacing the ring.

A cylindrical piston-like valve plunger 50 is operatively received within the cup 46. The valve plunger is securely connected to the plunger 33 by a valve stem 51, the upper end of said stem being threaded and screwed into a threaded opening in the lower end of the plunger 33, the upper end of said stem passing through an opening in the diaphragm 37. A washer 52, immediately below the diaphragm, is snugly held against said diaphragm by a nut 53 on the valve stem to seal the diaphragm around the valve stem. The lower end of the valve stem is provided with a downwardly extending portion 54 of a diameter smaller than the diameter of the stem and thereby forming a shoulder 55 against which the upper surface of the valve plunger abuts, the valve plunger being provided with a downwardly extending hub-like portion 56 having a central opening therein to receive the extension 54 of the valve stem. A nut 57 on the end of said extension secures the valve plunger 50 to the stem, the end of said extension and nut being covered with a cap 58 threadably received on the hub 56. Said cap also serves to secure a washer 59 on the lower surface of the valve plunger 50. A downwardly extending skirt 60 forms a wall which protects the outer edge of the washer 59 and lengthens said valve longitudinally. The washer, when the valve is in the closed position, rests on the upper edge of the ring 47 to prevent the passage of gas from the inlet chamber 61 of the housing 40 into the cup. The valve plunger is also provided with an upwardly extending skirt 62 to give additional length thereto, said valve plunger 50 being of such length as to cover, when in the closed position gas passages 63, 64, 65, and 66 through the wall of the cup. The flow of gas is indicated by the arrows 67 and 68. The gas enters the housing through the inlet 69, passes into the inlet chamber 61 and from chamber 61 through the central opening 70 in the ring 47. With the valve in any one of the four modulating positions, indicated by the dotted lines numbered 1, 2, 3, and 4 in Figure 7, the gas passes through said central opening 70 into the cup and thence through opening 63 in the cup wall and thence into the outlet chamber 71 of the housing 40. From the chamber 71 the gas is conducted by suitable pipes to the furnace burner. The inlet and outlet sides of the housing are separated below the cup chamber by a vertical partition 71a.

The valve is opened by the operation of the electric motor 15 actuating the gears 18, 20, 21, 22, 23, and 24 causing shaft 19 to rotate. As the shaft rotates the eccentric is also rotated and said eccentric imparts a reciprocating movement to the connecting rod 32 thus drawing the plunger 33 upwardly and thereby drawing the valve plunger 50 upwardly to expose the openings 63, 64, 65, and 66 in the cup to permit the flow of gas therethrough.

To maintain the valve in its open position the motor 15 is stalled with the electric current passing through the motor coils. Upon the shutting off of the electric current to the motor the spring 27, which is wound upon the rotation of the shaft 19 by the motor, actuates the shaft 19 in the opposite direction thereby closing said valve, the eccentric being on lower dead center or substantially so when the valve plunger is in the closed position holds said valve plunger against any upward movement due to pressure against the bottom thereof.

The modulating mechanism comprises a disk 72 secured by a pin 73 to the shaft 19, said disk supporting a dial 74 in spaced association therewith upon posts 75 secured between said disk 72 and dial 74 by screws 76. The dial 74 is provided with an opening through which the shaft 19 extends forwardly thereof, and said opening is large enough to accommodate slidably a sleeve 77 carried on an adjustment disk 78 and extending forwardly of said adjustment disk. The adjustment disk 78 may be slidably and rotatably moved on the shaft 19 but is normally locked in engagement with disk 72 by means hereinafter described. The rear side of said adjustment disk is normally in contact with the front side of disk 72 and receives the hub 79 of said disk 72 in a recess adapted therefor. Said disk 78 is urged against disk 72 by a spring 80 within a recess 81 in the sleeve 77 and around the shaft 19. The rear end of the spring 80 abuts against a shoulder 82 and the front end thereof abuts against a washer 83 secured to the forward end of shaft 19 by a screw 84 in said shaft. The forward end of sleeve 77 is received within an elongated knob 85 secured thereto by a set screw 86. The knob 85 is provided at its rear end with an indicator arrow 87 for indicating the various modulating positions of the valve, said adjustments being made by pulling the knob forwardly until the pins 88 of the adjustment disk 78 are completely withdrawn from their respective holes in the disk 72 and turned for insertion into other holes in the disk 72. The disk 72 is provided with two series of four holes diametrically opposed and are adapted to provide four adjustment positions for the adjustment disk. A notch 89 in one side of disk 72 slidably receives a pin 90 set in disk 72 and said notch is adapted to provide shoulders 91 for limiting the rotary movement of the disk 78 relative to disk 72. The disk 78 is provided with an arm 92 extending radially therefrom and having adjacent the outer end thereof a forwardly extending roller 93 rotatably mounted on a screw 94, said screw being screwed into a suitable opening in the arm 92. During the opening of the valve the arm moves in a clock-wise direction from a substantially horizontal position to the right of the shaft 19 to a substantially horizontal position opposite thereof. Said arm moves with the shaft 19 and is held against rotary movement relative thereto by the locking together of the disk 78 and the disk 72. During the closing of the valve the arm 92 moves in the same path as taken during the opening thereof but in the opposite direction. The return movement of the arm may be interrupted by a pawl 95 operatively hinged to a support 96 by a screw 97, said support being secured to the frame member 12 and spaced forwardly thereof by collars 98, screws 99 securing said support to the frame member 12.

The pawl 95 is provided with a notch 100 in its free swinging end adapted, when the pawl is in the uppermost position, to engage the roller 93 of the arm 92 to limit the return movement thereof, thereby interrupting the closing of the valve at a point intermediate of the fully opened and the closed position. The valve in said intermediate or modulate position exposes portions of hole 63 in the cup 46 to permit a limited supply of fuel to pass therethrough. The amount of fuel permitted to pass through the opening 63 in the cup is determined by the respective position of the valve plunger 50 as adjusted by the adjustment of the disk 78 relative to the disk 72, said adjustments of the disks 78 and 72 determining and limiting the downward movement of the valve plunger 50. The four adjustment positions are indicated on the dial 74 by the numerals 1, 2, 3, and 4 and the respective valve positions relative to the opening 63 are indicated by the dotted lines 1, 2, 3, and 4 in Figure 7.

In the heating of a house a thermostat 101 is secured in the usual way in one of the rooms of said house. As the house temperature drops, the arm 102 of the thermostat contacts point C thereof closing the electric motor circuit and operating the motor 15 which in turn operates the valve opening means to fully open the valve at which position the motor stalls and maintains the valve in said open position as long as the arm 102 of the thermostat contacts point C and maintains the electric circuit to the motor.

With one exception to be hereinafter noted, the circuit to relay 103 is always closed during the operation and use of the valve. As the circuit is closed a soft-iron core 104 is energized to draw an arm 105 against said core. A pin 106, extending laterally from the arm 105, and received between a downwardly extending arm 107 of the pawl 95 and a downwardly extending spring 108, moves said spring forwardly thus raising the free end of the pawl upwardly into the position shown in Figure 7 in which position the pawl is adapted to engage the roller 93 of the arm 92 and limit the return movement of said arm. The return movement of the arm occurs when the house temperature rises and the arm 102 of the thermostat moves away from point C breaking the circuit to the motor.

The motor then ceases to maintain the valve in the open position and allows the spring 27 to rotate the shaft 19 in a counter-clockwise direction. The movement of said shaft is interrupted by the engagement of the roller 93 of arm 92 with the end of the pawl 95. The valve, remaining in a partly open position, permits a limited amount of fuel to pass through the opening 63 in the cup 46, said fuel passes on to the burner which continues to burn and heat the house at a reduced heating speed until the temperature may again drop low enough to cause the arm 102 of the thermostat to contact point C and start the electric motor again to fully open the valve. Due to the operation of the burner at a reduced heating speed, the house temperature will drop very slowly and said constant operation of the burner will provide an uninterrupted supply of heat to the rooms of the house at all required times thus preventing the formation of a layer of cold air on the floors of the house. As the roller 93 engages the free swinging end of the pawl 95 contact is made with the projecting end 109 of a rod 110, slidably received in a longitudinal opening in the pawl, and said rod is forced inwardly. The rear end 111 of the rod extends transversely of the pawl and is operatively connected to an arm 112 extending rearwardly of a spring switch arm 113. As the rod 110 moves rearwardly, the switch arm is moved toward a switch arm 114 until contact is made between contact points 115 and 116 of switch arms 113 and 114 respectively. The contact between the contact points 115 and 116 is adapted to close an electric circuit to an electric motor-driven fan for forcing air through the heat conduits of the furnace when said furnace is operating at the modulated burner speed. The fan is only needed to force heat through the conduits while the furnace is operating at the modulated burner speed as only a relatively small amount of heat is then developed by the furnace. With the valve in its fully open position the roller of arm 92 is out of contact with the rod 110 permitting the tension of the spring switch arm 113 to break the contact of contact point 115 with contact point 116 thereby shutting off the fan. The natural tendency of heated air to rise will carry said heated air up through the heat conduits of the furnace to the various rooms of the house when the burner is operating at full flame.

As the circuit to the relay 103 is normally closed at all such times as the furnace is being operated the pawl 95 is in the upper position. Should the valve be closed with the pawl in said upper position said pawl may be depressed by the roller 93 as it travels from the closed to the open position of the valve due to the yielding qualities of the spring 108. The spring 108 will raise the pawl to the upper position again upon the passing of the roller past the end of the pawl.

Should the outside temperature rise unseasonably or otherwise so that the house will become unduly warm the thermostat arm 102 will move into contact with point H thereby closing the electric circuit to relay 117. The iron core of said relay will thereupon become energized and will draw lever 118 thereagainst. As the lever 118 is drawn against the iron core of said relay 117 the circuit to relay 103 is broken by the raising of a contact bar 119 from a pair of spaced contact points 120, said contact points being insulated from each other. Upon the breaking of the circuit to relay 103 a pin 121 slidably mounted in an opening 122 in the core of said relay is urged outwardly by a spring mounted in said opening 122 behind said pin 121. The outward movement of the pin 121 forces the lever 105 away from the relay core thus forcing lever 107 of the pawl rearwardly and thereby drawing the free swinging end of the pawl downwardly and releasing the arm 92 of the adjustment disk 78. The spring 27 thereupon operates to completely close the valve and shutting off the burner of the furnace until the temperature of the house drops enough to cause arm 102 of the thermostat to come into contact with point C thereof and opening the valve to start the burner operating with a full flame.

However, as soon as the temperature drops enough to cause arm 102 to break contact with point H of the thermostat the circuit to relay 117 is broken and a pin 122 slidably mounted in an opening 123 in the core of relay 117 is forced outwardly by a spring 124 operatively mounted within the opening 123. The outward movement of the pin 122 forces lever 118 outwardly from the core and brings contact bar 119 into contact with contact points 120 thereby closing the circuit to relay 103 which operates to raise pawl 95 to the upper position in which position it is again ready to interrupt the arm 92 and hold said arm in the modulating position. All electrical circuits are suitably insulated and the contact bar 119 is suitably insulated from electrical contact with lever 118 by pieces of insulating material 119a secured to said lever 118 by a screw 125.

In case of electric current failure the valve may be operated manually by a double arm 126 pivotally mounted to frame member 12 by a screw 127. Centrally positioned on the upper side of said arm and with the screw 127 as an axis is a gear segment 128 operatively meshed with a pinion 129 secured to shaft 19 between the outer side of frame member 12 and disk 72. The valve is opened manually by moving the arm 127 from the position shown in dotted lines in Figure 2 to the position shown in solid lines in the same figure.

A pawl 130 is provided to releasably lock the arm 126 in the open position. The pawl is secured to a pin 131 having the ends thereof pivotally mounted respectively in the frame member 12 and the support 36. Said pawl is normally held out of engagement with the teeth of the gear segment 128 by a spring 132 having one end thereof secured to the pin 131 and the other end in operative engagement with a peg 133. An upwardly extending handle 134 is provided on the pawl for moving said pawl into engagement with the gear segment. A peg 134a, set in the frame member 12, limits the outward movement of the pawl.

In locking the valve mechanism with the pawl the valve is not fully opened so that the motor can operate said mechanism a little farther upon the resumption of the electric current supply to the motor. A slight operation of the mechanism by the motor will release the pawl. Consequently, with the thermostat calling for heat, the reestablishment of the electric current to the motor will cause said motor to operate the valve mechanism to the fully open position thereby moving the arm 128 and disengaging the pawl 120 from the gear segment.

Holes 135 in the arm are provided for securing damper or draft chains thereto for operating dampers or draft doors on the furnace. As the arm 128 moves with the actuating of the valve said dampers or draft doors may be opened and closed as the valve is opened and closed. Damper or draft chains may be attached to either side of the arm for operating doors hinged either at the top or the bottom.

A cover 136 encloses the mechanism above the base 10 and is secured thereto by a nut 137 on a bolt 138 secured at the lower end to the frame member 11. The cover is provided with a door 139 to provide ready access to the relays without removing the entire cover, said door having lugs 140 along the upper edge thereof adapted to hook under the cover and a screw 141, screwed into a stud 142 of the base 10, secures the door thereto. An auxiliary door 143 provides ready access to electric posts therebehind and is secured to the cover by a screw 145. An insulated opening 146 provides an entrance for electric wires connected to the electric circuits of the valve operating mechanism.

An opening 147 in the face of the cover exposes portions of the dial 74. The words "off" and "on" on the dial are exposed through the openings 147 when the valve is in the "off" and "on" positions respectively. When the valve is in the modulating position the numbers "4, 3, 2, 1" on the dial are exposed through the opening and the indicating arrow 87 points to the respective valve adjustment position. Valve adjustment positions are also marked on the cover. Modulating adjustments of the valve can only be made when the valve is in the open or in the closed position.

As the electric motor operates on low voltage a suitable transformer 148 is provided.

In the electric circuits shown in Figure 8 a metal strap 149 is provided to form a contact between contact post 150 and contact post 151 for maintaining an unbroken circuit therebetween. Should a pilot light be used in the furnace the strap 149 is removed from the posts 150 and 151 and the wires 152 and 153 connected to the thermostat of the pilot light.

Having thus described my invention what I claim is:

1. Fluid fuel control means comprising a valve, means for opening the valve, said means having an arm operatively associated therewith adapted to move with the operative movements of the valve, a pawl, means for moving the pawl into engagement with the arm to limit the movement of the arm in one direction at a position intermediate of the extreme limits of movement of said arm, means for releasing the pawl from engagement with the arm, and means for yieldingly maintaining the pawl in the arm engaging position.

2. Fluid fuel control means comprising a valve, electric-motor-driven means for opening the valve, means for closing the valve, a pawl for releasably interrupting the return movement of the valve for limiting the flow of gas through said valve a relay for bringing the pawl into the interrupting position an electric control circuit for said relay a second relay for controlling the circuit of the first mentioned relay a control circuit for said second relay and thermostatic means for controlling the motor and relay circuits.

3. Fluid fuel control means comprising a valve, means for opening the valve, means for closing the valve, means for interrupting the closing of the valve at a predetermined position, an electric fan switch, and means for closing said switch when the valve is in the interrupted position, said switch automatically opening upon the valve leaving said interrupted position.

4. Fluid fuel control means comprising a valve, means for opening the valve, means for returning the valve to the closed position, means for interrupting the closing of the valve at a predetermined position to permit a limited flow of fuel through the valve, an indicator dial fixed to a shaft of the valve mechanism and adapted to rotate therewith, and means for adjusting the interrupted position of the valve to regulate the amount of gas passing through the valve in said interrupted position and indicating said adjusted positions on the indicator dial.

JAMES WHALEN.